US012499864B2

(12) United States Patent
Wang et al.

(10) Patent No.: US 12,499,864 B2
(45) Date of Patent: Dec. 16, 2025

(54) ACTIVE SOUND ATTENUATION FOR AIRCRAFT ELECTRICAL SYSTEM

(71) Applicant: Pratt & Whitney Canada Corp., Longueuil (CA)

(72) Inventors: Xi Wang, Montreal (CA); Jeremy Gonzalez, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 168 days.

(21) Appl. No.: 17/876,833

(22) Filed: Jul. 29, 2022

(65) Prior Publication Data

US 2024/0034481 A1 Feb. 1, 2024

(51) Int. Cl.
*G10K 11/178* (2006.01)
*B64D 47/00* (2006.01)

(52) U.S. Cl.
CPC ........ *G10K 11/17823* (2018.01); *B64D 47/00* (2013.01); *G10K 11/17873* (2018.01); *G10K 2210/1281* (2013.01); *G10K 2210/3027* (2013.01); *G10K 2210/3044* (2013.01)

(58) Field of Classification Search
CPC ....... G10K 11/17823; G10K 11/17873; G10K 2210/1281; G10K 2210/3027; G10K 2210/3044; B64D 47/00
USPC ....................................................... 381/71.1
See application file for complete search history.

(56) References Cited

U.S. PATENT DOCUMENTS

| 4,689,821 | A | 8/1987 | Salikuddin |
| 10,935,647 | B2 | 3/2021 | Sly |
| 10,959,003 | B2 | 3/2021 | Sly |
| 2016/0083073 | A1 | 3/2016 | Beckman |
| 2017/0154618 | A1* | 6/2017 | Beckman ......... G10K 11/17857 |
| 2017/0174334 | A1 | 6/2017 | Beckman |
| 2018/0005643 | A1 | 1/2018 | Tsingos |
| 2018/0362155 | A1* | 12/2018 | Tweedt ............... B64C 29/0033 |
| 2020/0277064 | A1* | 9/2020 | Thomassin ........... H02P 29/028 |
| 2023/0009612 | A1* | 1/2023 | Cappellini ............... B60K 6/40 |

FOREIGN PATENT DOCUMENTS

WO 2022014748 A1 1/2022

OTHER PUBLICATIONS

Devillers et al. (Characterization of acoustic noise and vibrations due to magnetic forces in induction machines for transport applications using Manatee software, Proceedings of ISMA 2016, 2016) (Year: 2016).*
EP Search Report for EP Patent Application No. 23188534.4 dated Dec. 15, 2023.

(Continued)

*Primary Examiner* — Paul Kim
*Assistant Examiner* — Douglas J Suthers
(74) *Attorney, Agent, or Firm* — Getz Balich LLC

(57) ABSTRACT

A method is provided for operating an aircraft system. During this method, an electric machine of an electrical system is operated onboard an aircraft. A first set of electrical system waves produced by the electrical system is sensed. A set of electrical system attenuation waves is produced to attenuate a second set of electrical system waves produced by the electrical system in response to sensing the first set of the electrical system waves.

18 Claims, 8 Drawing Sheets

(56) References Cited

OTHER PUBLICATIONS

"De Havilland Canada Dash 8-400 Turboprop Becomes First Regional Aircraft Recertified to Meet ICAO's Most Stringent Noise Standards", Sep. 1, 2020, https://dehavilland.com/en/news/posts/de-havilland-canada-dash-8-400-turboprop-becomes-first-regional-aircraft-recertified-to-meet-icaos-most-stringent-noise-standards.
"Product Focus: Headsets and Unwanted Noise", Aviation Today, May 1, 2004, https://www.aviationtoday.com/2004/05/01/product-focus-headsets-and-unwanted-noise/.
Dash9-200/300 Airplane General, Smartcockpit.com, https://www.smartcockpit.com/docs/Dash8-200-300-Airplane_General.pdf.
Q400 Active Noise Control Video, Jun. 19, 2014, https://www.youtube.com/watch?v=oVZEtDyTdBI.

\* cited by examiner

ACTIVE SOUND ATTENUATION FOR AIRCRAFT ELECTRICAL SYSTEM

TECHNICAL FIELD

This disclosure relates generally to an aircraft and, more particularly, to sound attenuation for an aircraft.

BACKGROUND INFORMATION

An aircraft propulsion system generates noise during operation. Various systems and methods are known in the art for passively and actively attenuating such noise. While these known noise attenuation systems and methods have various benefits, there is still room in the art for improvement.

SUMMARY

According to an aspect of the present disclosure, a method is provided for operating an aircraft system. During this method, an electric machine of an electrical system is operated onboard an aircraft. A first set of electrical system waves produced by the electrical system is sensed. A set of electrical system attenuation waves is produced to attenuate a second set of electrical system waves produced by the electrical system in response to sensing the first set of the electrical system waves.

According to another aspect of the present disclosure, a system is provided for an aircraft. This aircraft system includes an electrical system and a noise attenuation system. The electrical system includes an electric machine. The noise attenuation system is configured to: sense a first set of electrical system sound waves produced by the electrical system; and produce a set of electrical system attenuation waves to attenuate a second set of electrical system sound waves produced by the electrical system in response to sensing the first set of the electrical system sound waves.

According to still another aspect of the present disclosure, another system is provided for an aircraft. This aircraft system includes an airframe and a propulsion system arranged with the airframe. The aircraft system also includes a noise attenuation system configured to: sense a first set of sound waves produced by the propulsion system; and produce a set of attenuation waves and direct the set of attenuation waves in a downward direction away from the airframe to attenuate a second set of sound waves produced by the propulsion system outside and below the airframe in response to sensing the first set of the sound waves.

The noise attenuation system may include a sensor, a controller and an electroacoustic transducer. The sensor may be configured to sense the first set of electrical system sound waves and provide a sound signal indicative of the first set of electrical system sound waves. The controller may be configured to generate an attenuation signal based on the first set of electrical system sound waves. The electroacoustic transducer may be configured to produce the set of electrical system attenuation waves in response to receiving the attenuation signal.

The aircraft system may also include an airframe. The noise attenuation system may be configured to attenuate the second set of electrical system sound waves with the set of electrical system attenuation waves outside of the airframe.

The aircraft system may also include an airframe. The noise attenuation system may be configured to direct the set of electrical system attenuation waves in a downward direction away from airframe.

The electrical system waves may be or otherwise include electrical system sound waves.

The first set of electrical system waves and the second set of electrical system waves may be produced by the electric machine.

The first set of electrical system waves and the second set of electrical system waves may also be produced by electrical circuitry for operating the electric machine.

The first set of electrical system waves and the second set of electrical system waves may be produced by electrical circuitry for operating the electric machine.

The method may also include driving rotation of a propulsor rotor of a propulsion system for the aircraft using the electric machine.

The method may also include: sensing a first set of propulsor waves produced by the propulsor rotor; and producing a set of propulsor attenuation waves to attenuate a second set of propulsor waves produced by the propulsor rotor response to sensing the first set of the propulsor waves.

The set of electrical system attenuation waves may attenuate the second set of electrical system waves outside of the aircraft.

The first set of electrical system waves may be sensed by one or more sensors at an exterior of the aircraft.

The set of electrical system attenuation waves may be produced by one or more electroacoustic transducers at an exterior of the aircraft.

At least a first of the one or more electroacoustic transducers may be directed towards ground beneath the aircraft.

The one or more electroacoustic transducers may include: a forward electroacoustic transducer located with a forward portion of the aircraft; and an aft electroacoustic transducer located with an aft portion of the aircraft.

The one or more electroacoustic transducers may also include an intermediate electroacoustic transducer located with an intermediate portion of the aircraft between the forward portion and the aft portion.

The method may also include: sensing sound at an exterior of the aircraft, the sensing of the sound including the sensing of the first set of electrical system waves; processing a sound signal indicative of the sound to determine one or more components of the sound signal indicative of the first set of electrical system waves; and generating an attenuation signal based on the one or more components of the sound signal indicative of the first set of electrical system waves. The set of electrical system attenuation waves may be produced based on the attenuation signal.

The method may also include selectively operating a sound attenuation system based on one or more flight parameters. The first set of electrical system waves may be sensed by the sound attenuation system. The set of electrical system attenuation waves may be produced by the sound attenuation system. The one or more flight parameters may include at least one of a phase of flight, an altitude of an aircraft, a location of the aircraft or a power setting of the electric machine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
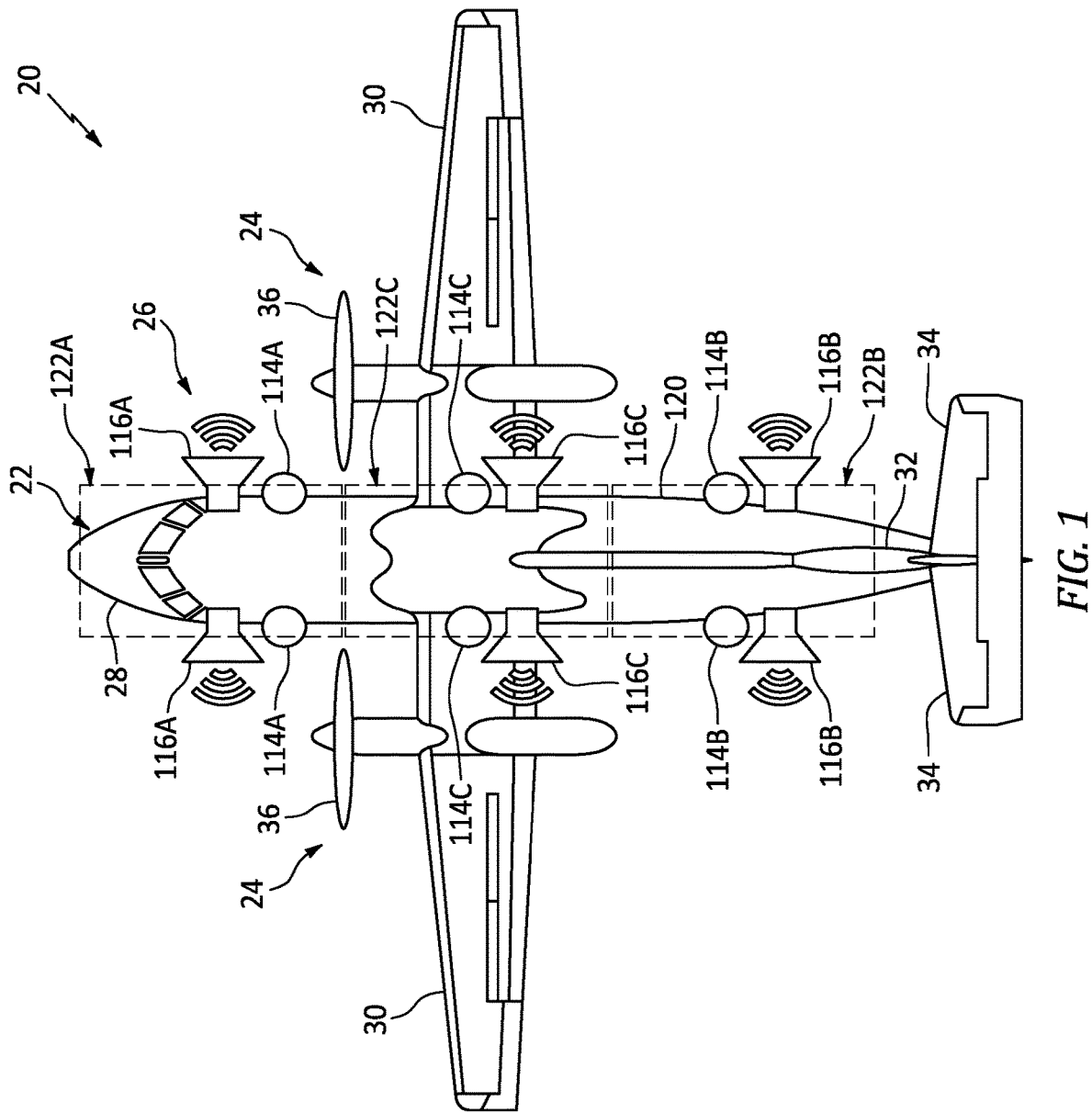
FIG. 1 is a top view illustration of an aircraft schematically depicted with a sound attenuation system.
Figure 2:
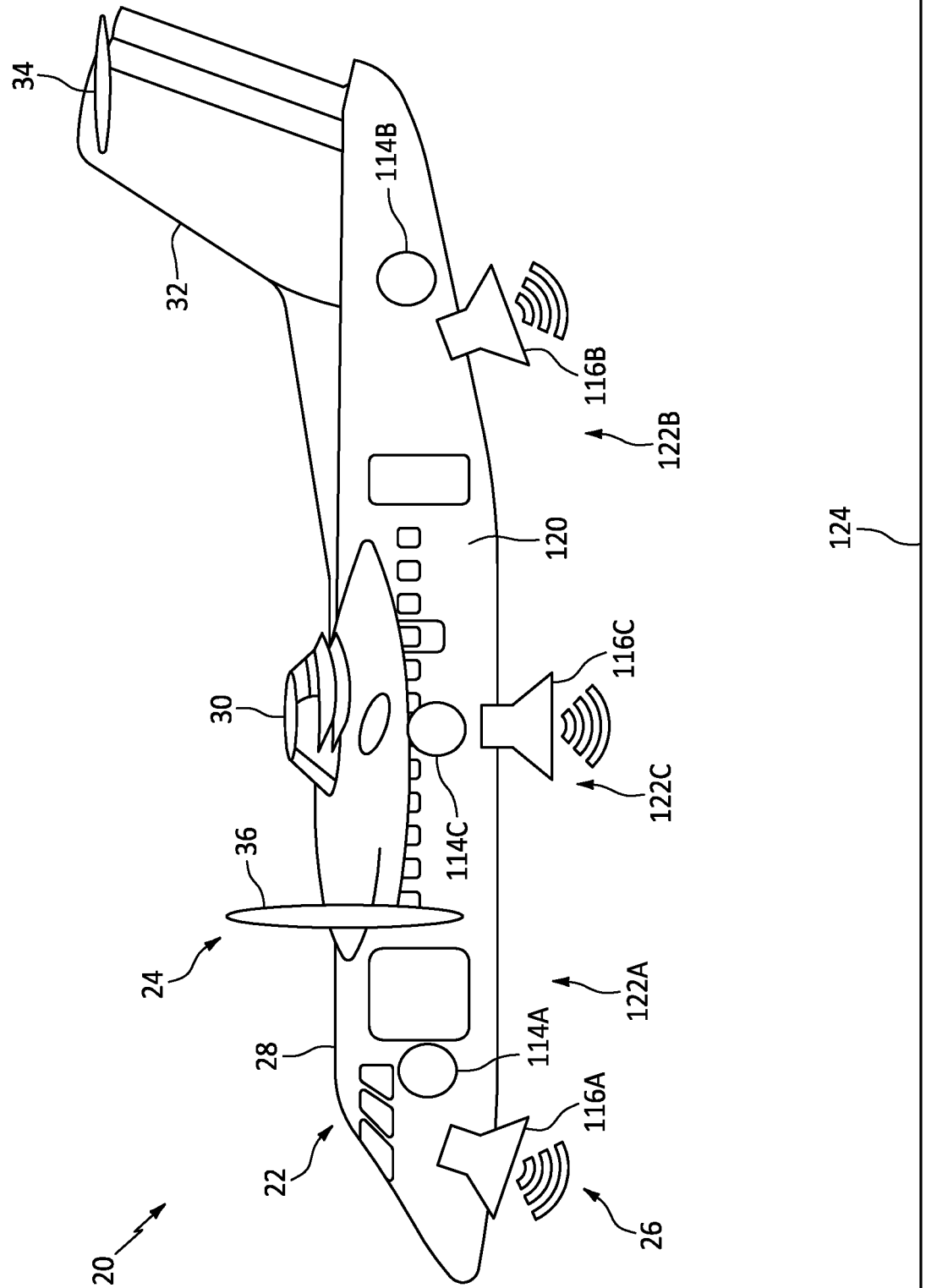
FIG. 2 is a side view illustration of the aircraft schematically depicted with the sound attenuation system.

FIGS. 1 and 2 illustrate an aircraft 20 configured as an airplane; e.g., a propeller plane. The aircraft 20 of the present disclosure, however, may alternatively be configured as a helicopter, a drone (e.g., an unmanned aerial vehicle (UAV)) or any other manned or unmanned aerial vehicle. The aircraft 20 of FIGS. 1 and 2 includes an aircraft airframe 22, one or more aircraft propulsion systems 24 and a (e.g., active) sound attenuation system 26 (see also FIG. 3), which may also be referred to as a noise attenuation system. The airframe 22 of FIGS. 1 and 2 includes an aircraft fuselage 28, a plurality of aircraft wings 30, an aircraft vertical stabilizer 32 and one or more aircraft horizontal stabilizers 34.

Figure 3:
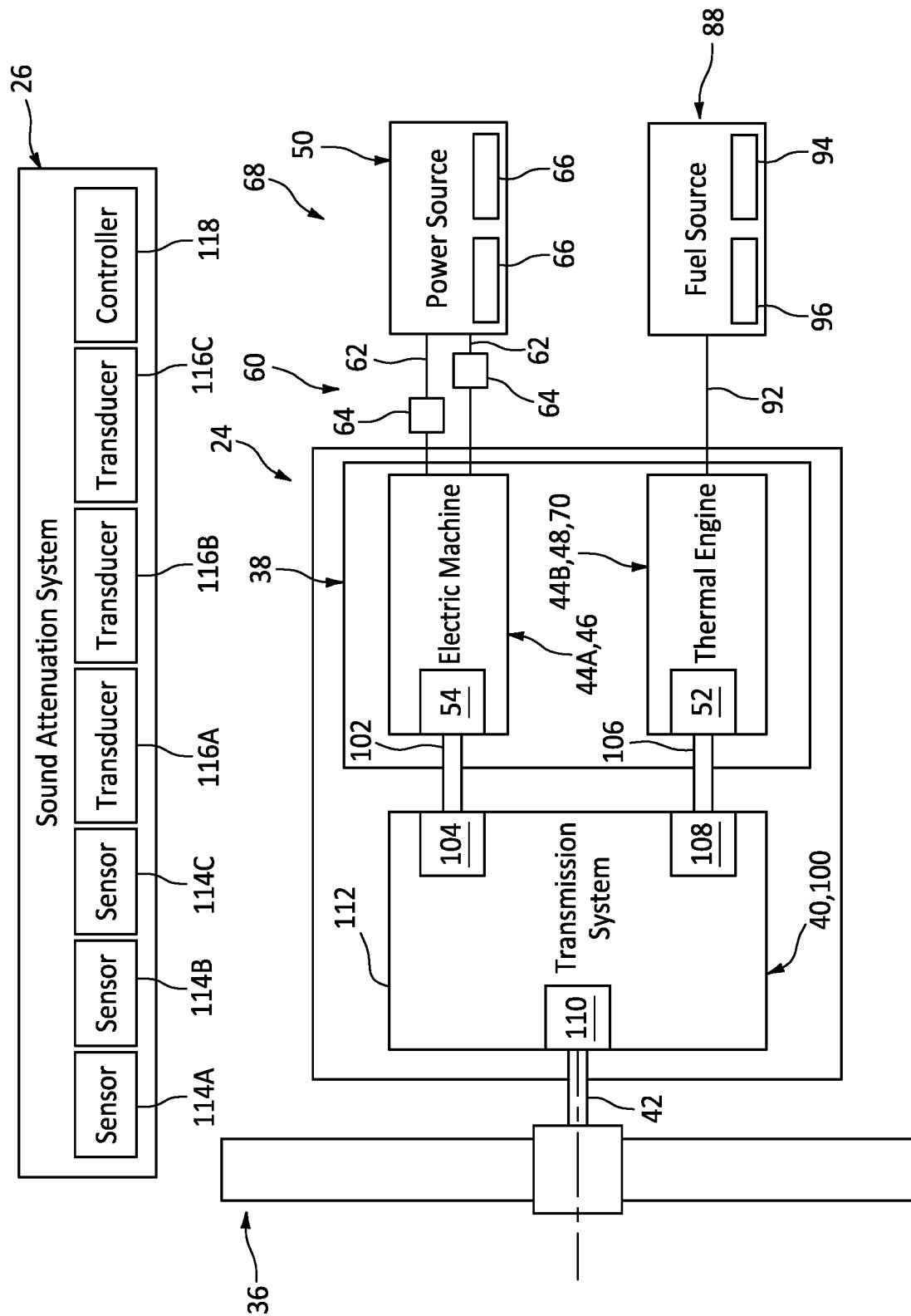
FIG. 3 is a schematic illustration of an aircraft system for the aircraft.

The aircraft propulsion systems 24 may be arranged on opposing lateral sides of the fuselage 28. Each aircraft propulsion system 24 of FIGS. 1 and 2, for example, is mounted to a respective one of the wings 30. The present disclosure, however, is not limited to such an exemplary arrangement. For example, each of the aircraft propulsion systems 24 may alternatively be mounted to a respective side of the fuselage 28. Referring to FIG. 3, each of the aircraft propulsion systems 24 includes at least (or only) one bladed propulsor rotor 36, a propulsion system powerplant 38 and a transmission system 40 for transmitting mechanical power from the powerplant 38 to the propulsor rotor 36.

The propulsor rotor 36 may be configured as an open rotor or a ducted rotor. Examples of the open rotor include, but are not limited to, a propeller (see also FIGS. 1 and 2) and a helicopter rotor (e.g., a main rotor). A non-limiting example of the ducted rotor is a fan rotor. The propulsor rotor 36 of FIG. 3 is coupled to and rotatable with a propulsor shaft 42 and/or another torque transmission device.

The powerplant 38 includes one or more drive units 44 (e.g., 44A and 44B) configured to drive rotation of the propulsor rotor 36. Examples of these drive units 44 include, but are not limited to, an electric machine (e.g., when operated as an electric motor) and a thermal engine (e.g., an internal combustion (IC) engine). The drive units 44 within the powerplant 38 may have different configurations. One of the drive units 44, for example, may be configured as an electric machine whereas another (e.g., the other) one of the drive units 44 may be configured as a thermal engine. Alternatively, the drive units 44 within the powerplant 38 may have a common (the same) configuration. Each of the drive units 44, for example, may be configured as an electric machine. Furthermore, while FIG. 3 illustrates the powerplant 38 with two of the drive units 44, the powerplant 38 may alternatively include a single drive unit (e.g., an electric machine) or more than two of the drive units 44. For ease of description, however, the first drive unit 44A is described herein as an electric machine 46 and the second drive unit 44B is described herein as a thermal engine 48.

The electric machine 46 may be selectively configurable as an electric motor and/or an electric generator. For example, during a motor mode of operation, the electric machine 46 may operate as the electric motor to convert electricity received from a power source 50 into mechanical power. This mechanical power may be utilized for various purposes within the propulsion system 24 such as, for example, rotating the propulsor rotor 36 and/or rotating a rotating structure 52 within the thermal engine 48 during thermal engine startup. When operating as the electric motor, the electric machine 46 may be sized to draw at least one megawatt (1MW) of electrical power from the power source 50; e.g., between one megawatt (1MW) and three megawatts (3MW). The present disclosure, however, is not limited to such an exemplary power draw. During a generator mode of operation, the electric machine 46 may operate as the electric generator to convert mechanical power received from, for example, the engine rotating structure 52 and/or the propulsor rotor 36 into electricity. This electricity may be utilized for various purposes within the powerplant 38 such as, for example, electrically powering one or more electric components of the powerplant 38 and/or charging the power source 50. The electricity may also or alternatively be utilized for various purposes outside of the powerplant 38 and/or the propulsion system 24 such as, for example, electrically powering one or more electric components in the aircraft 20. Of course, in other embodiments, the electric machine 46 may alternatively be configured as a dedicated electric motor where the electric machine 46 is not also operable as an electric generator.

Figure 4:
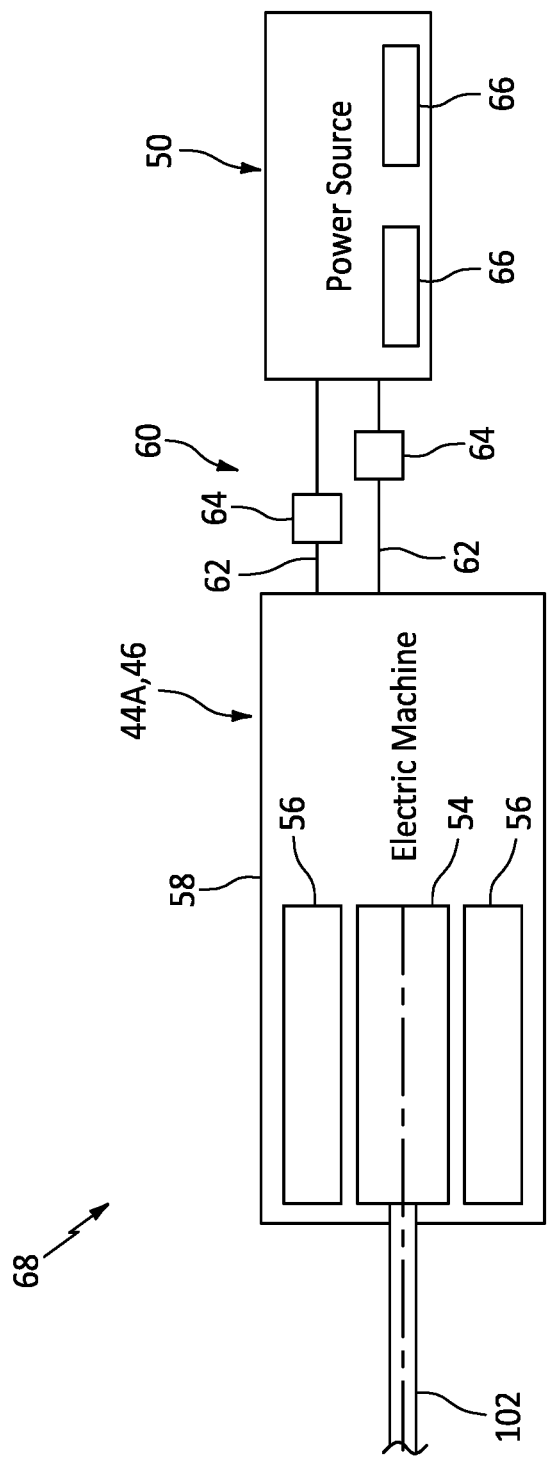
FIG. 4 is a schematic illustration of a portion of the aircraft system with an electric machine.

The electric machine 46 of FIG. 4 includes an electric machine rotor 54 and an (e.g., annular) electric machine stator 56. The electric machine 46 also includes an electric machine case 58 that at least partially or completely houses the machine rotor 54 and the machine stator 56.

The machine stator 56 may be radially outboard of and circumscribe the machine rotor 54. Alternatively, the machine rotor 54 may be radially outboard of an circumscribe (or otherwise be positioned relative to) the machine stator 56. The machine rotor 54 is configured to move (e.g., rotate) relative to the machine stator 56. During the motor mode of operation, the machine stator 56 may receive electrical power from the power source 50 and induces an electromagnetic field with the machine rotor 54 that drives rotation of the machine rotor 54. During the generator mode of operation, the machine rotor 54 is rotatably driven (e.g., by the thermal engine 48) and induces an electric electromagnetic field with the machine stator 56 that generates electrical power.

The power source 50 is electrically coupled with the electric machine 46 through electrical circuitry 60. This electrical circuitry 60 may include one or more leads 62 (e.g., high voltage lines) and one or more electrical devices 64 for conditioning, metering, regulating and/or otherwise controlling electrical power transfer between the electric machine 46 and the power source 50. Examples of the electrical devices 64 include, but are not limited to, switches, current regulators, converters and buffers.

The power source 50 is configured to store electricity. The power source 50 is also configured to provide the stored electricity to the electric machine 46 and/or receive electricity from the electric machine 46; e.g., during recharging. The power source 50, for example, may be configured as or otherwise include one or more electricity storage devices 66;

e.g., batteries, etc. The power source 50 and its electricity storage device(s) 66 may receive electricity (e.g., be charged by) a fuel cell converter, a thermal engine (e.g., the thermal engine 48 or another thermal engine) and/or any other electrical generator/power source onboard the aircraft 20 (or offboard the aircraft 20 when not in flight).

The electric machine 46, the power source 50 and the electrical circuitry 60 collectively form or may otherwise be included as part of an electrical system 68 for the aircraft propulsion system 24. Each of the aircraft powerplants 38 may include its own dedicated electrical system 68. Alternatively, the aircraft powerplants 38 may share a common electrical system 68. The electrical system 68, for example, may include each electric machine 46 as well as a common power source 50 servicing the multiple electric machines 46 and/or a common electrical circuitry 60 servicing the multiple electric machines 46.

Referring to FIG. 3, the thermal engine 48 is configured to convert chemical energy stored within fuel into mechanical power. The thermal engine 48 of FIG. 5, for example, is configured as or may otherwise include a gas turbine engine 70. The present disclosure, however, is not limited to such an exemplary thermal engine. The thermal engine 48, for example, may alternatively be configured as or otherwise include a reciprocating piston engine, a rotary engine or any other type of internal combustion (IC) engine with an engine rotating structure capable of being monitored and/or capable of driving rotation of the propulsor rotor 36 as described herein. In the case of the reciprocating piston engine, the engine rotating structure 52 may be configured as or otherwise include a crankshaft and one or more pistons coupled to the crankshaft. In the case of the rotary engine, the engine rotating structure 52 may be configured as or otherwise include a driveshaft and an (e.g., triangular) engine rotor (e.g., eccentrically) coupled to the driveshaft. However, for ease of description, the thermal engine 48 may be described or referred to herein as the gas turbine engine 70.

Figure 5:
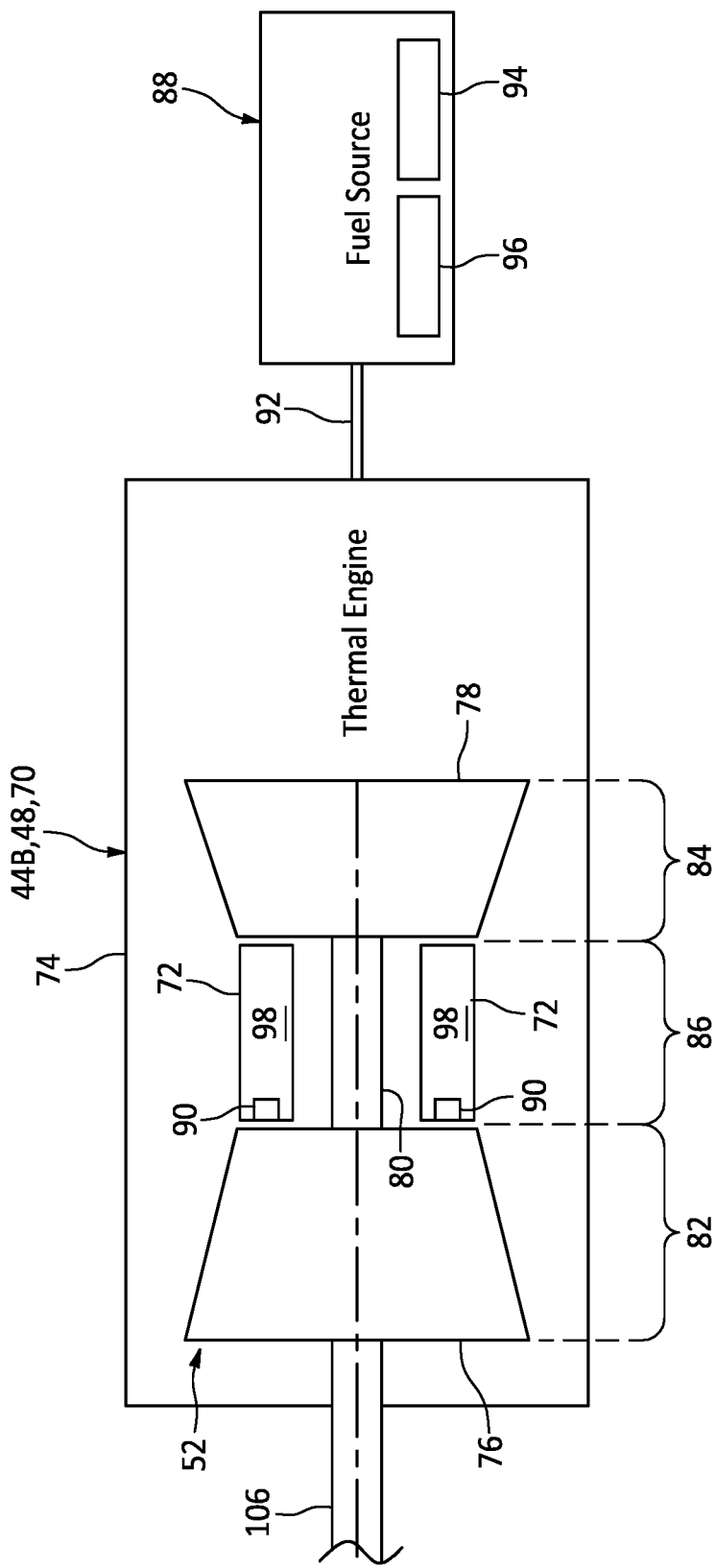
FIG. 5 is a schematic illustration of a portion of the aircraft system with a thermal engine.

The gas turbine engine 70 of FIG. 5 includes the engine rotating structure 52, a combustor 72 and an engine case 74 housing the engine rotating structure 52 and the combustor 72. The engine rotating structure 52 includes a bladed compressor rotor 76, a bladed turbine rotor 78 and an engine shaft 80 connecting and rotatable with the compressor rotor 76 and the turbine rotor 78. The compressor rotor 76 is arranged in a compressor section 82 of the gas turbine engine 70. The turbine rotor 78 is arranged within a turbine section 84 of the gas turbine engine 70. The combustor 72 is arranged within a combustor section 86 of the gas turbine engine 70. The gas turbine engine 70, however, is not limited to such an exemplary configuration. The gas turbine engine 70, for example, may include multiple of the rotating structures (e.g., spools) such that, for example, the compressor section 82 includes at least a low pressure compressor (LPC) rotor and a high pressure compressor (HPC) rotor and/or the turbine section 84 includes at least a high pressure turbine (HPT) rotor and a low pressure turbine (LPT) rotor. With multi-rotating structures, the engine rotating structure 52 for driving the propulsor rotor 36 (see FIG. 3) may include each of the elements 76, 78 and 80 or may be configured without the compressor rotor 76 where, for example, the turbine rotor 78 is a free turbine rotor/a power turbine rotor. The gas turbine engine 70 may also or alternatively be configured as a direct drive gas turbine engine or a geared gas turbine engine; e.g., where a geartrain couples together one or more engine rotors.

A fuel source 88 is configured to provide the fuel (e.g., jet fuel, diesel, gasoline, etc.) to the gas turbine engine 70 (the thermal engine 48). The fuel source 88 of FIG. 5, for example, is fluidly coupled with one or more fuel injectors 90 of the gas turbine engine 70 through at least (or only) one fuel line 92. The fuel source 88 is also configured to store (e.g., contain a quantity of) the fuel before, during and/or after heat engine operation. The fuel source 88 of FIG. 5, for example, includes a fuel reservoir 94 and a fuel flow regulator 96. The fuel flow regulator 96 may be or otherwise include a pump and/or a valve. This fuel flow regulator 96 is configured to direct fuel received from the fuel reservoir 94 to the fuel injectors 90 through the fuel line 92.

During operation of the gas turbine engine 70 of FIG. 5, air enters a gas path within the gas turbine engine 70 through an airflow inlet. The gas path extends sequentially through the compressor section 82, the combustor section 86 and the turbine section 84. This air is compressed by the compressor rotor 76 and directed into a combustion chamber 98 of the combustor 72. The fuel received by the gas turbine engine 70 from the fuel source 88 is injected into the combustion chamber 98 by the fuel injectors 90 and mixed with the compressed air to provide a fuel-air mixture. This fuel-air mixture is ignited and combustion products thereof flow through and cause the turbine rotor 78 and, thus, the engine rotating structure 52 to rotate. The rotation of the turbine rotor 78 drives rotation of the compressor rotor 76 and, thus, compression of the air received from the airflow inlet. The rotation of the engine rotating structure 52 also provides mechanical power for driving (e.g., rotating) the propulsor rotor 36 of FIG. 3.

The transmission system 40 of FIG. 3 may be configured as or otherwise include a geartrain 100. This geartrain 100 is configured to motively couple/operatively connect the electric machine 46 and the thermal engine 48 to the propulsor rotor 36. An electric machine coupler 102 (e.g., a shaft), for example, rotatably couples the electric machine 46 and its machine rotor 54 to a first component 104 of the geartrain 100; e.g., a gear, a carrier, a shaft, etc. A thermal engine coupler 106 (e.g., a shaft) rotatably couples the thermal engine 48 and its engine rotating structure 52 to a second component 108 of the geartrain 100; e.g., a gear, a carrier, a shaft, etc. The propulsor shaft 42 rotatably couples the propulsor rotor 36 to a third component 110 of the geartrain 100; e.g., a gear, a carrier, a shaft, etc. These geartrain components 104, 108 and 110 are arranged together within a geartrain case 112 such that mechanical power may be transmitted through the transmission system 40, its geartrain 100 and geartrain components 104, 108 and 110, for example: (1) from the electric machine 46 to the propulsor rotor 36; (2) from the thermal engine 48 to the propulsor rotor 36; (3) from the thermal engine 48 to the electric machine 46; and/or (4) from the electric machine 46 to the thermal engine 48.

Figure 6:
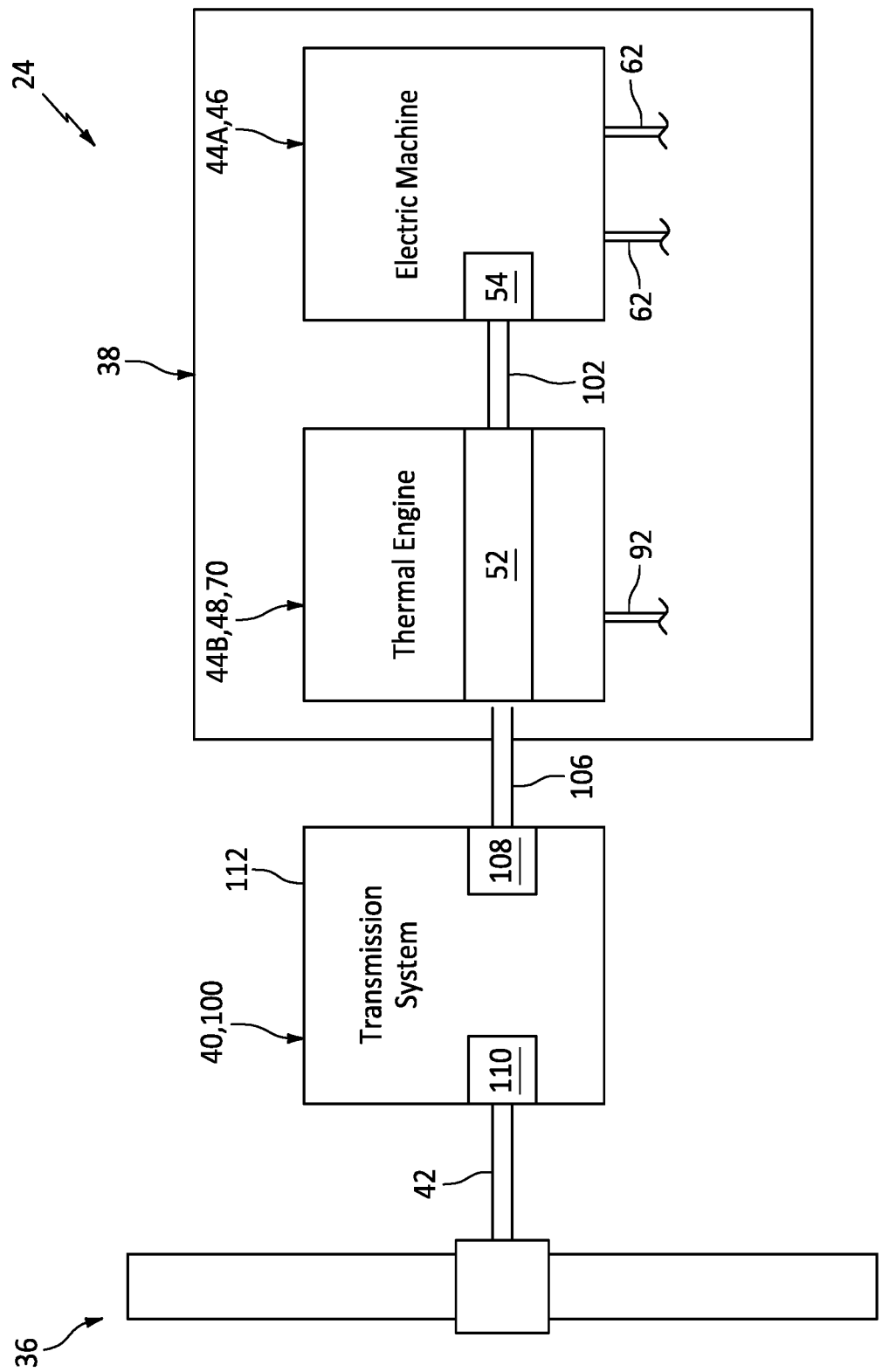
FIG. 6 is a schematic illustration of the aircraft system with an alternative transmission arrangement.

In some embodiments, referring still to FIG. 3, the electric machine 46 and the thermal engine 48 may be configured in parallel to drive the propulsor rotor 36 through the transmission system 40 and its geartrain 100. In other embodiments, referring to FIG. 6, the electric machine 46 and the thermal engine 48 may be configured in series to drive the propulsor rotor 36. The propulsor rotor 36 of FIG. 6, for example, is operably coupled to the electric machine 46 serially through the transmission system 40/the geartrain 100 and the thermal engine 48. The present disclosure, however, is not limited to such an exemplary arrangement.

During propulsion system operation, the electrical system(s) 68 may produce a constant and/or intermittent electrical system sound; e.g., sound waves. The electrical system sound may include a rotor sound produced by rotation of the machine rotor(s) 54. The electrical system sound may include a field sound produced by the generation of the electromagnetic field between the machine rotor 54 and the machine stator 56 (see FIG. 4). The electrical system sound may include a circuitry sound produced by a flow and/or switching of the flow of electricity through the electrical circuitry 60. The electrical system sound may be a hum, a whir, a whine and/or other noise with a relatively low frequency; e.g., up to one kilohertz (1 kHz). Such low frequency sound may be considered unpleasant to and/or may otherwise disturb nearby observers; e.g., humans and/or animals.

The sound attenuation system 26 of the present disclosure is provided and configured to attenuate (e.g., reduce or eliminate) one or more or all of the components of the electrical system sound produced by the electrical system(s) 68. The sound attenuation system 26, for example, may be specifically tailored to attenuate the rotor sound, the field sound, the circuitry sound and/or various other sounds produced by or otherwise resulting from operation of the electrical system 68 and its electric machine 46. Of course, it is contemplated the sound attenuation system 26 may also or alternatively attenuate one or more other (e.g., non-electrical system) sounds; e.g., thermal engine sounds, propulsor rotor sounds, etc. The sound attenuation system 26 of FIG. 3 includes one or more sound sensors 114 (e.g., 114A, 114B and 114C), one or more electroacoustic transducers 116 (e.g., 116A, 116B and 116C) and an attenuation system controller 118.

Referring to FIGS. 1 and 2, the sound sensors 114 are arranged at (e.g., on, adjacent or proximate) an exterior of the aircraft 20. The sound sensors 114, for example, may be arranged at various locations at and along an outer skin 120 of the airframe 22 and its fuselage 28. The upstream, forward sound sensors 114A of FIGS. 1 and 2, in particular, are located with (e.g., on, along, etc.) a forward portion 122A of the airframe 22 and its fuselage 28. The downstream, aft sound sensors 114B are located with an aft portion 122B of the airframe 22 and its fuselage 28. The intermediate sound sensors 114C are located with an intermediate portion 122C of the airframe 22 and its fuselage 28, which intermediate portion 122C is longitudinally between the forward portion 122A and the aft portion 122B.

The sound sensors 114 are configured to sense sound propagating outside of (e.g., and to the sides of) the aircraft 20 and its airframe 22 and the aircraft propulsion system(s) 24. The sound sensors 114 may thereby sense one or more or all of the components of the electrical system sound produced by the electrical system(s) 68. The sound sensors 114 may also sense various other sounds propagating outside of the aircraft 20 such as, but not limited to, the thermal engine sounds, the propulsor rotor sounds, airflow sounds (e.g., wind noise), etc. The sound sensors 114 are further configured to individually or collectively provide one or more sound signals indicative of the sound(s) sensed outside of the aircraft 20. Each sound sensor 114 may be configured as or otherwise include a directional or multi-directional microphone.

The electroacoustic transducers 116 are arranged at the exterior of the aircraft 20. The electroacoustic transducers 116, for example, may be arranged at various locations at and along the outer skin 120 of the airframe 22 and its fuselage 28. The upstream, forward electroacoustic transducers 116A of FIGS. 1 and 2, in particular, are located with the forward portion 122A of the airframe 22 and its fuselage 28. The downstream, aft electroacoustic transducers 116B are located with the aft portion 122B of the airframe 22 and its fuselage 28. The intermediate electroacoustic transducers 116C are located with the intermediate portion 122C of the airframe 22 and its fuselage 28.

The electroacoustic transducers 116 are configured to receive one or more electrical system attenuation signals. The electroacoustic transducers 116 are further configured to produce electrical system attenuation sound based on the electrical system attenuation signal(s); e.g., the electroacoustic transducers 116 may convert the electrical system attenuation signal(s) into the electrical system attenuation sound. The electroacoustic transducers 116 may produce the electrical system attenuation sound outside of (e.g., and vertically below) the aircraft 20 and its airframe 22 and the aircraft propulsion system(s) 24. The electrical system attenuation sound may be specifically tailored to attenuate one or more or all of the components of the electrical system sound produced by the electrical system(s) 68. Of course, the electroacoustic transducers 116 may also or alternatively be configured to produce attenuation sound for attenuating one or more of the other sounds sensed by the sound sensors 114. Each electroacoustic transducer 116 may be configured as or otherwise include a loudspeaker/an audio speaker.

Referring to FIG. 2, each electroacoustic transducer 116 may be arranged to direct the electrical system attenuation sound in a vertical downward direction. Each electroacoustic transducer 116, more particularly, may direct the electrical system attenuation sound in a direction away from the aircraft 20 and its airframe 22 and towards ground 124 beneath the aircraft 20. With such a configuration, the sound attenuation may be directed/focused towards observers outside of and below the aircraft 20. Furthermore, the sound sensors 114 are less likely to sense the electrical system attenuation sound since the electrical system attenuation sound is directed away from the sound sensors 114. The electrical system sound sensed by the sound sensors 114 thereby may not require, or use minimal, filtering to remove any electrical system attenuation sound in the environment outside of the aircraft 20.

The attenuation system controller 118 of FIG. 3 is in signal communication (e.g., hardwired and/or wirelessly connected) with the sound sensors 114 and the electroacoustic transducers 116. The attenuation system controller 118 is configured to receive the sound signal(s) from the sound sensors 114, process the sound signals to generate the electrical system attenuation signal(s), and provide the electrical system attenuation signal(s) to the electroacoustic transducers 116. The attenuation system controller 118 may be implemented with a combination of hardware and software. The hardware may include at least one processing device and a memory, which processing device may include one or more single-core and/or multi-core processors. The hardware may also or alternatively include analog and/or digital circuitry other than that described above.

The memory is configured to store software (e.g., program instructions) for execution by the processing device, which software execution may control and/or facilitate performance of one or more operations such as those described herein. The memory may be a non-transitory computer readable medium. For example, the memory may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 7:
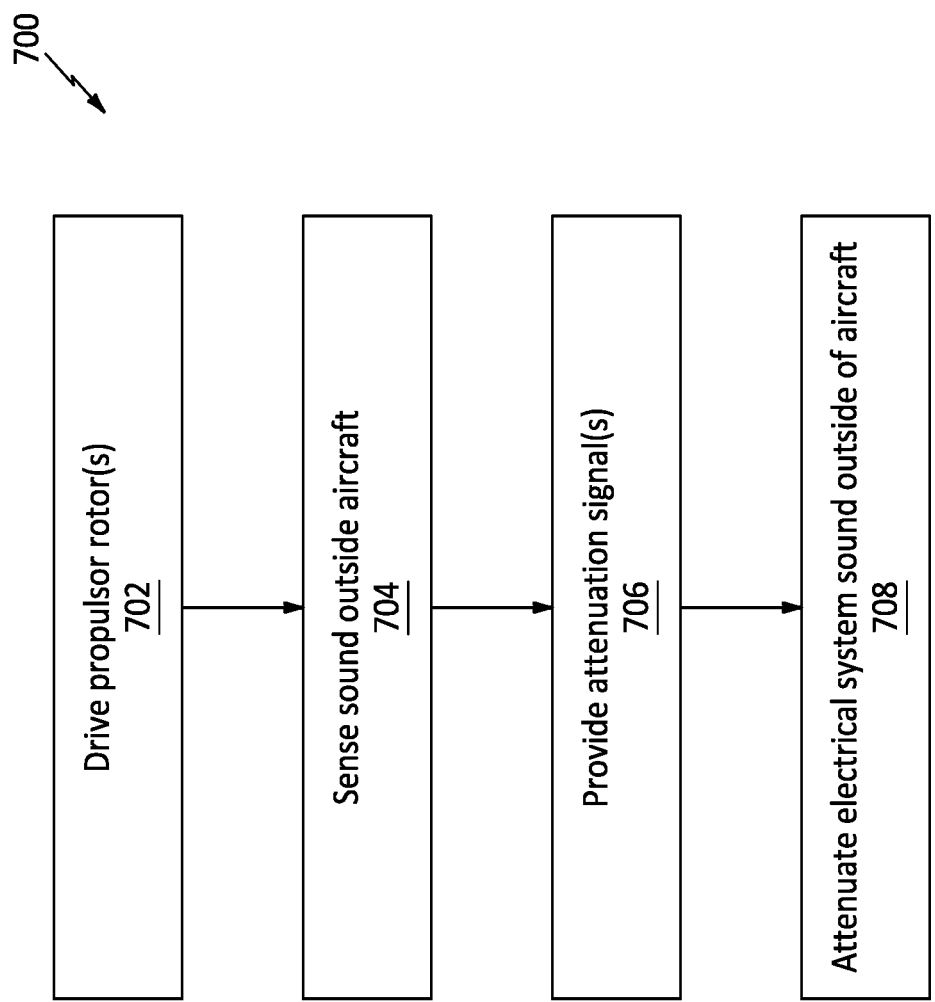
FIG. 7 is a flow diagram of a method for operating the aircraft and its aircraft system.

FIG. 7 is a flow diagram of a method 700 for operating an aircraft system. For ease of description, the operating method 700 is described herein with reference to the aircraft system described above. The operating method 700 of the present disclosure, however, is not limited to such an exemplary aircraft system.

In step 702, the aircraft propulsion system(s) 24 are operated to drive rotation of the propulsor rotor(s) 36. During this operating step 702, each electric machine 46 may operate in its motor mode of operation. The electric machine(s) 46 may thereby completely drive rotation of the propulsor rotor(s) 36. Alternatively, the electric machine(s) 46 and the thermal engine(s) 48 may work together to drive rotation of the propulsor rotor(s) 36.

In step 704, one or more of the sound sensors 114 sense sound outside of the aircraft 20. Each of the sound sensors 114, for example, may sense a first (e.g., initial) set of electrical system sound waves produced by the electrical system(s) 68. This first set of the electrical system sound waves may include, but is not limited to: rotor sound waves produced by the rotation of the machine rotor(s) 54; field sound waves produced by the generation of the electromagnetic field; circuitry sound waves produced by the flow and/or switching of the flow of electricity through the electrical circuitry 60. The sound sensors 114 may also sense one or more other sets of sound waves. These other sound waves may include, but are not limited to: sound waves produced by operation of the thermal engine(s) 48; sound waves produced by rotation of the propulsor rotor(s) 36; sound waves produced by the flow of air along and outside of the aircraft 20 (e.g., wind noise); etc. The sound sensors 114 may then provide (e.g., generate) one or more sound signals indicative of the sensed sound waves.

In step 706, the attenuation system controller 118 provides (e.g., generates) one or more electrical system attenuation signals. The attenuation system controller 118, for example, may receive the sound signal(s) from the sound sensors 114. The attenuation system controller 118 may process data from the sound signal(s) to determine (e.g., identify) one or more components of the sensed sound waves indicative of the first set of electrical system sound waves. The attenuation system controller 118 may then use this information to determine an inverse of the first set of electrical system sound waves. The electrical system attenuation signal(s) are indicative of the determined inverse of the first set of electrical system sound waves.

Figure 8:
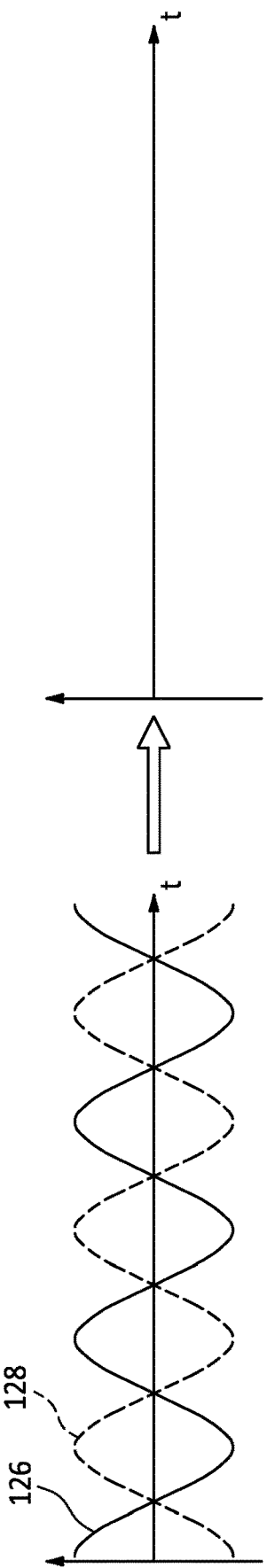
FIG. 8 is a graphical illustration of attenuation sound waves interfering with electrical system sound waves to attenuate the electrical system sound waves.

In step 708, one or more of the electroacoustic transducers 116 produce electric system attenuation sound outside of the aircraft 20. The electroacoustic transducers 116, for example, receive the electrical system attenuation signal(s) from the attenuation system controller 118 and produce corresponding electrical system attenuation sound waves outside of the aircraft 20. Referring to FIG. 8, the electrical system attenuation sound waves (e.g., see line 126) may destructively interfere with a second (e.g., subsequent) set of electrical system sound waves (e.g., see line 128) produced by the electrical system(s) 68. The electrical system attenuation sound waves may thereby attenuate the second set of electrical system sound waves. More generally, the attenuation sound produced by the electroacoustic transducers 116 may attenuate at least one or more components of the sound produced by operation of the electrical system(s) 68. Of course, a similar methodology may also or alternatively be used to attenuate any one or more of the other sensed sound waves.

In some embodiments, the sound attenuation system 26 may be operated (e.g., active)/the attenuation step 708 may be performed throughout aircraft operation; e.g., through an aircraft flight and while the aircraft propulsion systems 24 are operational on the ground. In other embodiments, however, the sound attenuation system 26 may be selectively operated (e.g., active)/the attenuation step 708 may be selectively performed. For example, the sound attenuation system 26 may be operated/the attenuation step 708 may be performed based on one or more flight parameters. Examples of these flight parameters include, but are not limited to, a phase of the flight, an altitude of the aircraft above the ground, a geographical location of the aircraft (e.g., relative to high density population areas) and a power setting of the electric machine. For example, where the aircraft 20 is at cruise and relatively high up off the ground, the sound attenuation system 26 may be non-operation. However, where the aircraft 20 is taxiing, taking off, climbing, descending or landing and thus is relatively close to the ground as well as populated areas, the sound attenuation system 26 may be operated/the attenuation step 708 may be performed. In other words, the sound attenuation system 26 may be selectively operated (e.g., active)/the attenuation step 708 may be selectively performed (e.g., only, particularly, etc.) when there is a high (or any) likelihood of benefitting an outside observer.

The attenuation system 26 is generally described above for attenuating sound waves. It should be noted, however, the attenuation 26 may also or alternatively be configured for attenuating, more generally, vibrations and/or energy waves.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for operating an aircraft system, comprising:
operating an electric machine of an electrical system onboard an aircraft, the aircraft including a powerplant comprising the electric machine, a transmission system, and a thermal engine, the electric machine and the thermal engine configured in parallel to drive a propulsor rotor through the transmission system;
sensing a first set of electrical system waves produced by electrical circuitry for operating the electric machine;
producing a set of electrical system attenuation waves to attenuate a second set of electrical system waves produced by the electrical circuitry for operating the electric machine in response to sensing the first set of the electrical system waves; and
selectively operating a sound attenuation system based on one or more flight parameters;
wherein the first set of electrical system waves are sensed by the sound attenuation system, and the set of electrical system attenuation waves are produced by the sound attenuation system; and
wherein the one or more flight parameters comprising a power setting of the electric machine.

2. The method of claim 1, wherein the first set of electrical system waves and the second set of electrical system waves comprise electrical system sound waves.

3. The method of claim 1, further comprising driving rotation of a propulsor rotor of a propulsion system for the aircraft using the electric machine.

4. The method of claim 3, further comprising:
sensing a first set of propulsor waves produced by the propulsor rotor; and
producing a set of propulsor attenuation waves to attenuate a second set of propulsor waves produced by the propulsor rotor in response to sensing the first set of the propulsor waves.

5. The method of claim 1, wherein the set of electrical system attenuation waves attenuate the second set of electrical system waves outside of the aircraft.

6. The method of claim 1, wherein the first set of electrical system waves are sensed by one or more sensors at an exterior of the aircraft.

7. The method of claim 1, wherein the set of electrical system attenuation waves are produced by one or more electroacoustic transducers at an exterior of the aircraft.

8. The method of claim 7, wherein at least a first of the one or more electroacoustic transducers is directed towards ground beneath the aircraft.

9. The method of claim 7, wherein the one or more electroacoustic transducers include
a forward electroacoustic transducer located with a forward portion of the aircraft; and
an aft electroacoustic transducer located with an aft portion of the aircraft.

10. The method of claim 9, wherein the one or more electroacoustic transducers further include an intermediate electroacoustic transducer located with an intermediate portion of the aircraft between the forward portion and the aft portion.

11. The method of claim 1, further comprising:
sensing sound at an exterior of the aircraft, the sensing of the sound comprising the sensing of the first set of electrical system waves;
processing a sound signal indicative of the sound to determine one or more components of the sound signal indicative of the first set of electrical system waves;
generating an attenuation signal based on the one or more components of the sound signal indicative of the first set of electrical system waves; and
the set of electrical system attenuation waves produced based on the attenuation signal.

12. The system of claim 1, wherein
the one or more flight parameters further includes at least one phase of flight; and
the at least one phase of flight includes one or more of taxiing, taking off, climbing, descending or landing.

13. A system for an aircraft, comprising:
an airframe;
a powerplant mounted with the airframe, the powerplant comprising an electric machine, a transmission system, and a thermal engine, and the electric machine and the thermal engine configured in series to drive a propulsor rotor through the transmission system;
an electrical system comprising the electric machine, the electric machine sized to draw at least one megawatt of electrical power from a power source; and
a noise attenuation system configured to
sense a first set of electrical system sound waves produced by the electrical system, the first set of electrical system sound waves comprising field sound waves produced by generation of an electromagnetic field and circuitry sound waves produced by electrical circuitry of the electrical system; and
produce a set of electrical system attenuation waves to attenuate a second set of electrical system sound waves produced by the electrical system in response to sensing the first set of the electrical system sound waves and based on a power setting of the electric machine, the second set of electrical system sound waves comprising the field sound waves and the circuitry sound waves.

14. The system of claim 13, wherein the noise attenuation system includes
a sensor configured to sense the first set of electrical system sound waves and provide a sound signal indicative of the first set of electrical system sound waves;
a controller configured to generate an attenuation signal based on the first set of electrical system sound waves; and
an electroacoustic transducer configured to produce the set of electrical system attenuation waves in response to receiving the attenuation signal.

15. The system of claim 13, wherein the noise attenuation system is further configured to attenuate the second set of electrical system sound waves with the set of electrical system attenuation waves outside of the airframe.

16. The system of claim 13, wherein the noise attenuation system is further configured to direct the set of electrical system attenuation waves in a downward direction away from airframe.

17. A system for an aircraft, comprising:
an airframe;
a propulsion system arranged with the airframe, the propulsion system comprising a geartrain, a thermal engine, an electric machine and a bladed propulsor rotor, the electric machine rotatably coupled to a first component of the geartrain, the thermal engine rotatably coupled to a second component of the geartrain, and the bladed propulsor rotor rotatably coupled to a third component of the geartrain; and
a noise attenuation system configured to
sense a first set of sound waves produced by the propulsion system, the first set of sound waves comprising field sound waves produced by generation of an electromagnetic field; and
produce a set of attenuation waves and direct the set of attenuation waves in a downward direction away from the airframe to attenuate a second set of sound waves produced by the propulsion system outside and below the airframe in response to sensing the first set of the sound waves, the second set of sound waves comprising the field sound waves;
wherein the noise attenuation system is selectively operated based on one or more flight parameters, the one or more flight parameters comprising a power setting of the electric machine.

18. The system of claim 17, wherein
the one or more flight parameters further includes a phase of flight; and
the phase of flight includes one or more of taxiing, taking off, climbing, descending or landing.

* * * * *